(12) United States Patent
Kim et al.

(10) Patent No.: US 12,218,439 B2
(45) Date of Patent: Feb. 4, 2025

(54) ANTENNA AND ELECTRONIC DEVICE COMPRISING SAME

(71) Applicant: Samsung Electronics Co., Ltd., Suwon-si (KR)

(72) Inventors: Jiho Kim, Suwon-si (KR); Moohyun Roh, Suwon-si (KR); Gyubok Park, Suwon-si (KR); Kyungmoon Seol, Suwon-si (KR); Seongyong An, Suwon-si (KR); Kyihyun Jang, Suwon-si (KR); Jaewon Choe, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 39 days.

(21) Appl. No.: 17/863,996

(22) Filed: Jul. 13, 2022

(65) Prior Publication Data

US 2022/0352632 A1 Nov. 3, 2022

Related U.S. Application Data

(63) Continuation of application No. PCT/KR2021/000672, filed on Jan. 18, 2021.

(30) Foreign Application Priority Data

Jan. 21, 2020 (KR) .................. 10-2020-0007885

(51) Int. Cl.
*H01Q 5/328* (2015.01)
*H01Q 5/335* (2015.01)
*H01Q 5/50* (2015.01)

(52) U.S. Cl.
CPC .............. *H01Q 5/50* (2015.01); *H01Q 5/328* (2015.01); *H01Q 5/335* (2015.01)

(58) Field of Classification Search
CPC .......... H01Q 5/50; H01Q 5/328; H01Q 5/335; H01Q 1/48; H01Q 9/42; H01Q 9/44;
(Continued)

(56) References Cited

U.S. PATENT DOCUMENTS

| 7,911,402 B2 | 3/2011 | Rowson et al. |
| 7,994,986 B2 | 8/2011 | Desclos et al. |

(Continued)

FOREIGN PATENT DOCUMENTS

| KR | 10-2011-0123995 A | 11/2011 |
| KR | 10-2016-0105244 A | 9/2016 |

(Continued)

OTHER PUBLICATIONS

Extended European Search Report dated Dec. 13, 2022, issued in European Application No. 21744071.8-1205.

(Continued)

*Primary Examiner* — Hai V Tran
*Assistant Examiner* — Michael M Bouizza
(74) *Attorney, Agent, or Firm* — Jefferson IP Law, LLP

(57) ABSTRACT

An electronic device is provided. The electronic device includes a housing including a conductive member on which at least one power supply point and ground point are positioned, at least one ground member arranged inside the housing, a first ground path connecting the ground point to the ground member, a second ground path connecting the ground point to the ground member, a printed circuit board (PCB) arranged inside the housing and a processor arranged on the PCB. The processor is configured to supply power to the at least one power supply point so that the conductive member transmits and/or receives a signal of a first frequency band.

15 Claims, 12 Drawing Sheets

(58) Field of Classification Search
CPC ........ H01Q 1/243; H04B 1/0458; H04B 1/18;
H04B 1/40; H04M 1/0249; H04M
1/0277; H05K 9/0064
See application file for complete search history.

(56) References Cited

U.S. PATENT DOCUMENTS

| | | | |
|---|---|---|---|
| 8,077,116 | B2 | 12/2011 | Shamblin et al. |
| 8,923,914 | B2 | 12/2014 | Kim et al. |
| 9,813,532 | B2 | 11/2017 | Kim et al. |
| 9,887,461 | B2 | 2/2018 | Kim et al. |
| 10,015,294 | B2 | 7/2018 | Lee et al. |
| 10,153,539 | B2 | 12/2018 | Seo et al. |
| 10,158,384 | B1 | 12/2018 | Yarga et al. |
| 10,200,092 | B1 | 2/2019 | Irci et al. |
| 10,340,592 | B2 | 7/2019 | Nam et al. |
| 10,516,772 | B2 | 12/2019 | Lee et al. |
| 2011/0012800 | A1 | 1/2011 | Shamblin et al. |
| 2016/0254590 | A1* | 9/2016 | Seo ........................ H01Q 5/335 343/876 |
| 2016/0294060 | A1 | 10/2016 | Meng et al. |
| 2017/0040668 | A1* | 2/2017 | Ayala Vazquez .... H01Q 13/106 |
| 2017/0098400 | A1 | 4/2017 | Yamakawa et al. |
| 2017/0244818 | A1 | 8/2017 | Kim et al. |
| 2018/0034148 | A1 | 2/2018 | Nam et al. |
| 2018/0035605 | A1 | 2/2018 | Guan et al. |
| 2018/0083344 | A1* | 3/2018 | Han ...................... H01Q 13/106 |
| 2018/0248251 | A1 | 8/2018 | Son et al. |
| 2019/0081385 | A1* | 3/2019 | Avser ..................... H01Q 5/328 |
| 2019/0081615 | A1* | 3/2019 | Edwards ............... H03J 1/0083 |
| 2019/0165836 | A1 | 5/2019 | Irci et al. |
| 2020/0036820 | A1 | 1/2020 | Lee et al. |
| 2020/0399055 | A1 | 12/2020 | Singh et al. |
| 2021/0167500 | A1 | 6/2021 | Declos et al. |

FOREIGN PATENT DOCUMENTS

| | | |
|---|---|---|
| KR | 10-2017-0020013 A | 2/2017 |
| KR | 10-2017-0098400 A | 8/2017 |
| KR | 10-2018-0013615 A | 2/2018 |
| KR | 10-2018-0035605 A | 4/2018 |
| KR | 10-2019-0037100 A | 4/2019 |

OTHER PUBLICATIONS

Korean Office Action with English translation dated Jan. 1, 2024; Korean Appln. No. 10-2020-0007885.
Korean Office Action with English translation dated Jul. 30, 2024; Korean Appln. No. 10-2020-0007885.
Korean Notice of Allowance with English translation dated Dec. 12, 2024; Korean Appln. No. 10-2020-0007885.

* cited by examiner

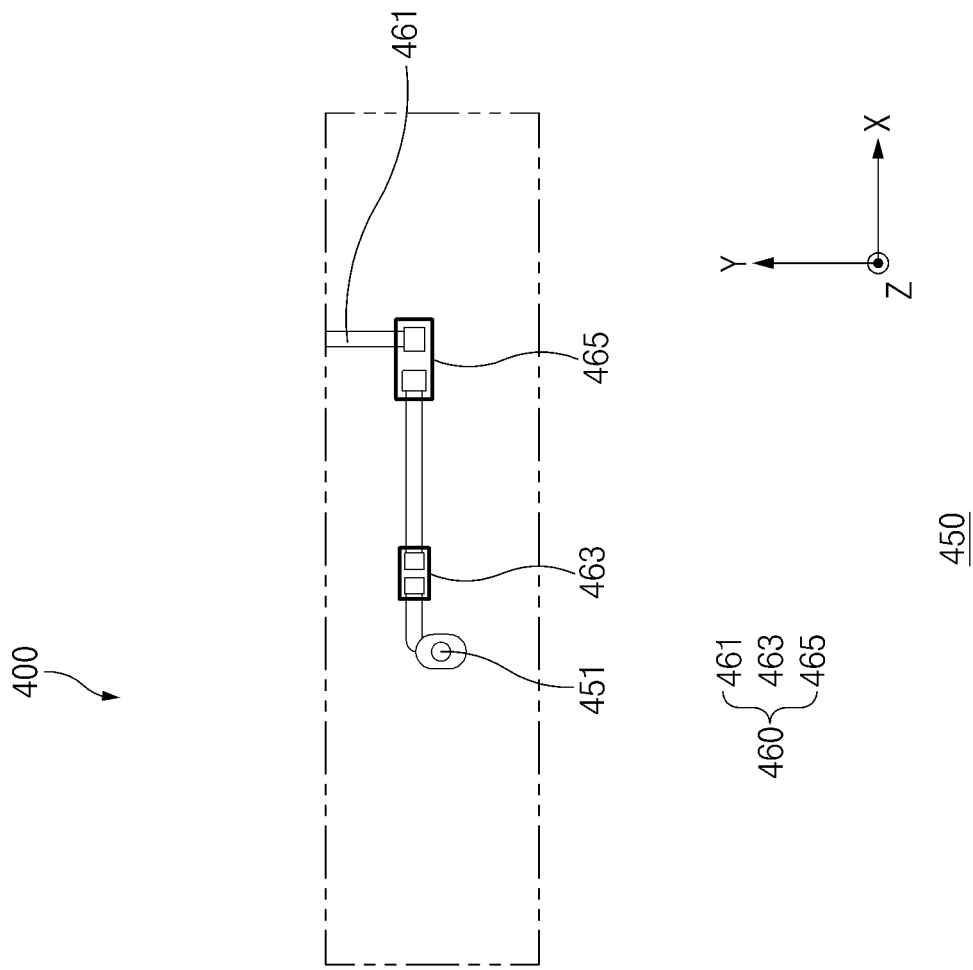
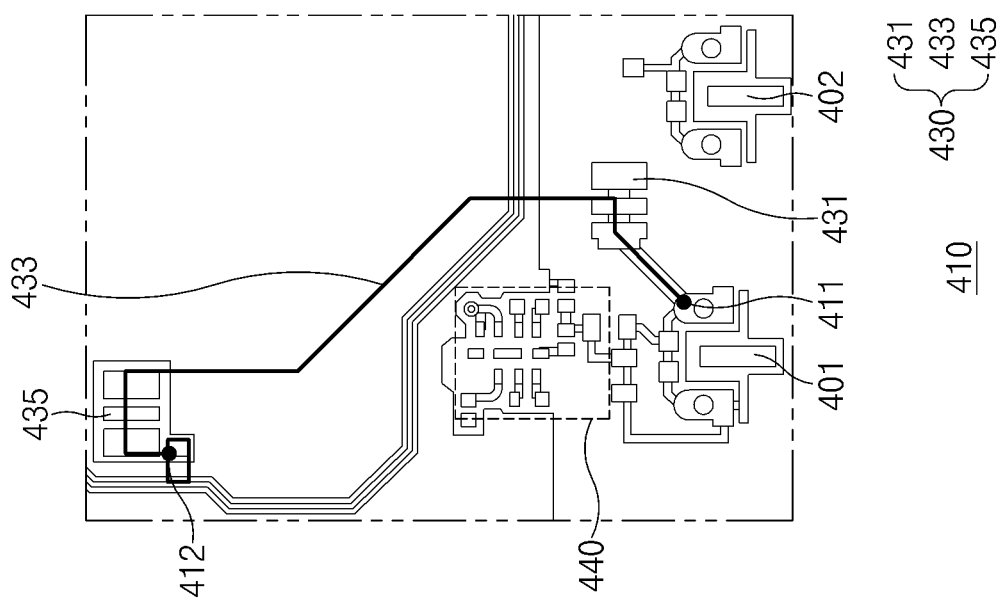
FIG. 4

ANTENNA AND ELECTRONIC DEVICE COMPRISING SAME

CROSS-REFERENCE TO RELATED APPLICATION(S)

This application is a continuation application, claiming priority under § 365(c), of an International application No. PCT/KR2021/000672, filed on Jan. 18, 2021, which is based on and claims the benefit of a Korean patent application number 10-2020-0007885, filed on Jan. 21, 2020, in the Korean Intellectual Property Office, the disclosure of which is incorporated by reference herein in its entirety.

BACKGROUND

1. Field

The disclosure relates to an antenna and an electronic device including the same.

2. Description of Related Art

With the development of mobile communication technology, electronic devices having an antenna have been widely used. The electronic device may transmit and/or receive a radio frequency (RF) signal including a speech signal or data (e.g., a message, a photo, a video, a music file, or a game) using an antenna.

When the housing of the electronic device includes a conductive member such as a metal frame, a radiator of the antenna may be implemented using the conductive member of the housing.

SUMMARY

At least a portion of the conductive member included in the housing of the electronic device may be used as a radiator of an antenna for a low-frequency band. A ground path connecting between a ground point of the conductive member and a ground member may be disposed. A current may flow from the conductive member to the ground member through the ground path.

When a single ground path is disposed between the conductive member and the ground member, a varistor and a matching circuit for preventing electric shock may be connected to the single ground path. When a single ground path is disposed, the amount of current flowing from the conductive member to the ground member of the printed circuit board (PCB) may be limited.

For example, a lumped element included in the matching circuit may have a resistance component having a specified magnitude in a low frequency band of about 600 MHz or more and about 900 MHz or less. When lumped elements are disposed between the conductive member and the ground member, a current flowing from the conductive member to the ground member may decrease, thereby reducing the performance of the antenna.

Aspects of the disclosure are to address at least the above-mentioned problems and/or disadvantages and to provide at least the advantages described below. Accordingly, an aspect of the disclosure is to provide an antenna capable of improving antenna performance in a low frequency band in an electronic device using a conductive member of a housing as a low frequency band antenna, and an electronic device including the same.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a conductive member in which at least one feeding point and a ground point are located, at least one ground member disposed inside the housing, a first ground path connecting the ground point and the ground member, a second ground path connecting the ground point and the ground member, a printed circuit board (PCB) disposed inside the housing, and a processor disposed on the PCB, wherein the processor is configured to feed the at least one feeding point such that the conductive member transmits and/or receives a signal of a first frequency band.

In accordance with another aspect of the disclosure, an electronic device is provided. The electronic device includes a housing formed of a conductive member, at least a portion of the conductive member being a radiator of a low frequency band, a support member disposed inside the housing, and a PCB disposed inside the housing and including a ground member, wherein a ground point is located on the conductive member, wherein the ground point and the ground member are connected through a plurality of ground paths, and wherein the plurality of ground paths include a first ground path including a laser direct structuring (LDS) pattern extending along the support member and a second ground path formed along the PCB.

In accordance with another aspect of the disclosure, an electronic device is provided. The electronic device includes a housing including a conductive member in which at least one feeding point and a ground point are located, a PCB disposed inside the housing and including at least one feeding part and a ground member, and a processor disposed on the PCB, wherein a plurality of ground paths connect the ground member and the ground point. The processor is configured to feed the at least one feeding point such that the conductive member transmits and/or receives a signal of 600 MHz or more and 900 MHz, a combined resistance of the plurality of ground paths may be a first resistance value, and the first resistance value may be less than or equal to a second resistance value that is a resistance value of a resistor connecting between the ground member and the ground point through a single ground path.

According to the embodiments disclosed herein, it is possible to increase a current flowing from the ground point to the ground member by forming two or more ground paths to connect the conductive member of the housing and the ground member of the PCB. Accordingly, in an electronic device using the conductive member as an antenna for a low frequency band, it is possible to improve the antenna performance in the low frequency band.

Other aspects, and salient features the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a diagram illustrating a ground point, a ground member, ground paths, and a first switching circuit of an electronic device according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
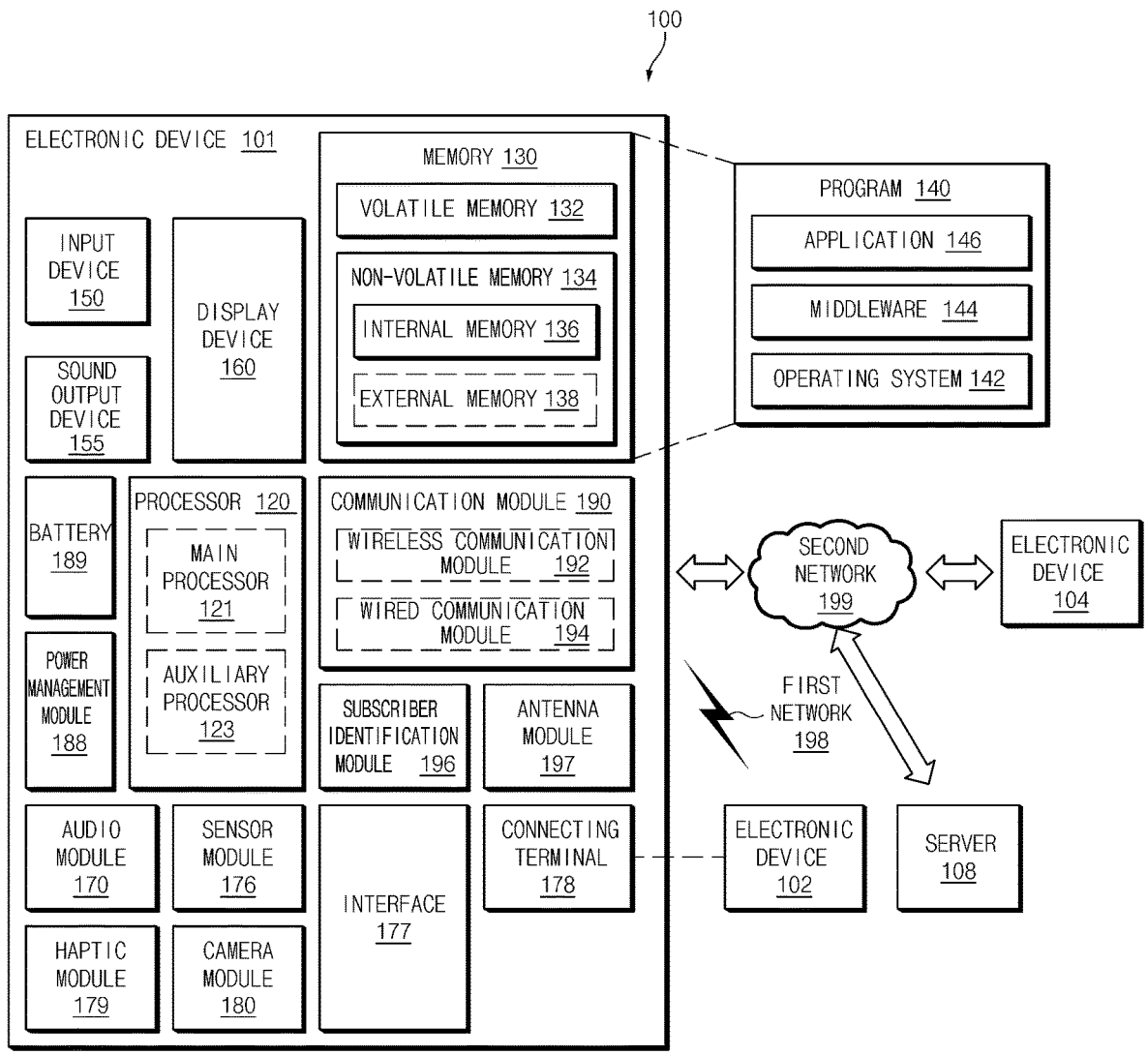
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
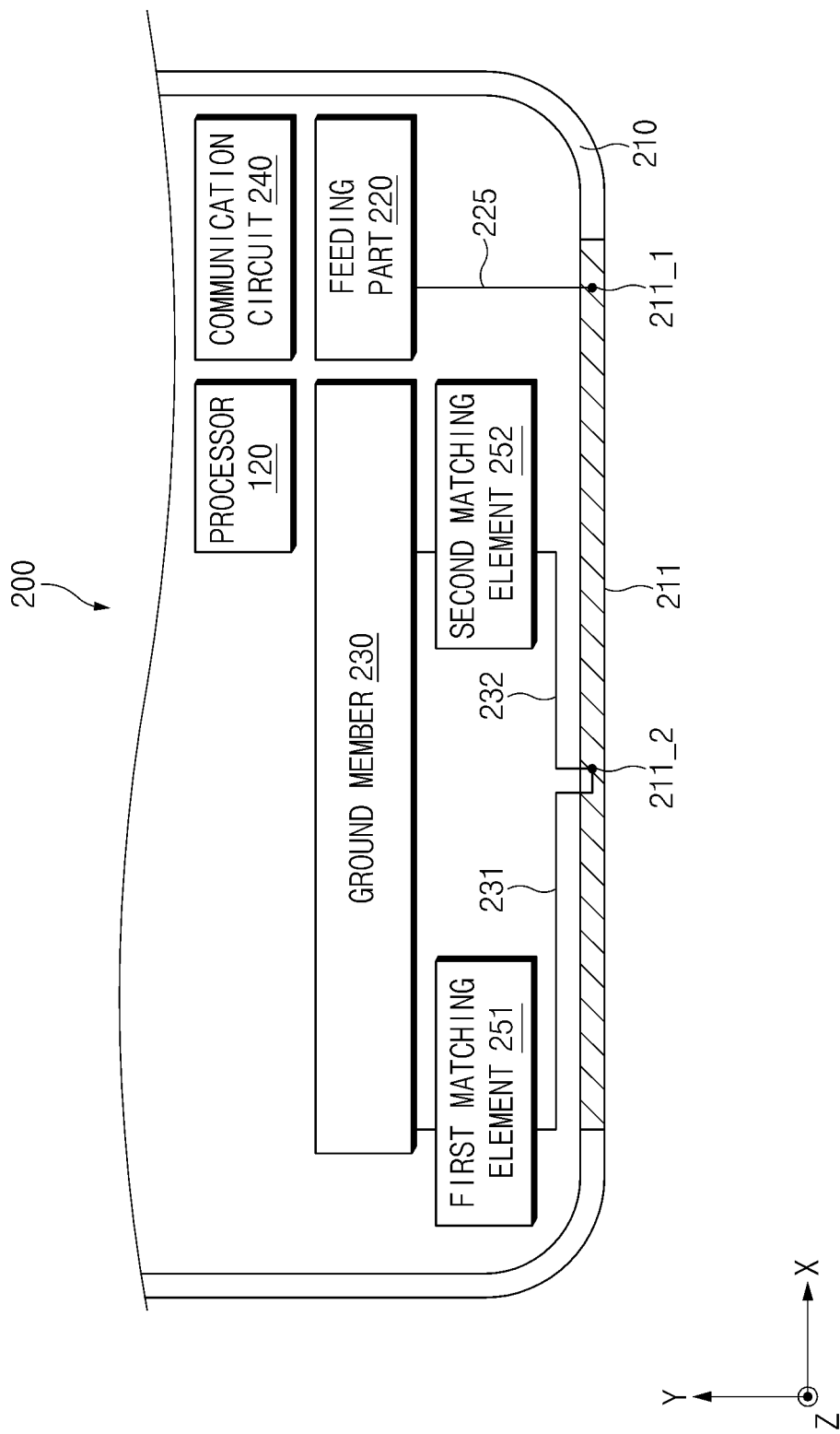
FIG. 2 is a diagram of an electronic device according to an embodiment of the disclosure.

FIG. 2 is a diagram 200 illustrating an electronic device (e.g., the electronic device 101 of FIG. 1) according to an embodiment of the disclosure.

The electronic device 101 according to an embodiment may include a housing 210, a conductive member 211, a feeding point 211_1, and a ground point 211_2. The electronic device 101 according to an embodiment may include a feeding part 220, a ground member 230, a communication circuit 240, and/or the processor 120.

In one embodiment, the electronic device 101 may include the housing 210 that forms an exterior. For example, at least a portion of the housing 210 may be formed of the conductive member 211. For example, the conductive member 211 may be a metal frame extending in the +X-axis direction. For example, the conductive member 211 may form the exterior of the electronic device 101.

In one embodiment, the conductive member 211 may be a metal frame. The conductive member 211 may operate as a radiator of an antenna of the electronic device 101.

In one embodiment, the conductive member 211 may be formed in the structure of an exterior metal frame. In one embodiment, at least a portion of the conductive member 211 may operate as a radiator of a low-frequency band, for example, a low-band antenna. In one embodiment, the conductive member 211 may be formed by physically and/or electrically floating with a body formed of a metal inside the electronic device 101.

In one embodiment, the feeding point 211_1 may be positioned on the conductive member 211. A signal of a specified frequency band may be fed to the conductive member 211 through the feeding point 211_1. In one embodiment, the feeding point 211_1 may feed a signal of a first frequency band. For example, the first frequency band may be a low-frequency band (LB) and/or a middle-frequency band (MB).

In one embodiment, the ground point 211_2 may be positioned on the conductive member 211. The ground point 211_2 may ground the conductive member 211. In one embodiment, the ground point 211_2 may be disposed in the −X-axis direction with respect to the feeding point 211_1.

In one embodiment, a printed circuit board (PCB) may be disposed inside the housing 210. In one embodiment, the PCB may include the feeding part 220 and/or the ground member 230.

In one embodiment, the processor 120 may be disposed on the PCB. In one embodiment, at least one PCB may be disposed inside the electronic device 101. For example, the processor 120 may be disposed on the PCB on which at least one feeding part and a ground member are disposed. As another example, the processor 120 may be disposed on a separate PCB from the PCB on which at least one feeding part and a ground member are disposed. The processor 120 may be electrically connected to the feeding part 220 or the communication circuit 240.

In one embodiment, the feeding point 211_1 and the ground point 211_2 may be positioned on the conductive member 211. For example, the feeding point 211_1 and the ground point 211_2 may be disposed to be spaced apart from each other in the X-axis direction. The feeding point 211_1 may be connected to the feeding part 220 through a feeding path 225.

In one embodiment, the ground member 230 may be connected to the ground point 211_2 through a plurality of ground paths 231 and 232. Each of the plurality of ground paths 231 and 232 may connect the ground point 211_2 and the ground member 230 in parallel. For example, the ground member 230 may be connected to the ground point 211_2 through the first ground path 231 and the second ground path 232. The ground member 230 may have a voltage of substantially the same level electrically. For example, the ground member 230 may have a voltage of 0V, which is a ground voltage of substantially the same level.

In one embodiment, the ground point 211_2 and the ground member 230 may be connected using the plurality of ground paths 231 and 232. Although it is illustrated in FIG. 2 that two ground paths 231 and 232 are connected in parallel, the disclosure is not limited thereto, and two or more ground paths are disposed in parallel to connect the ground point 211_2 and the ground member 230.

In one embodiment, the plurality of ground paths 231 and 232 may be formed in parallel. The plurality of ground paths 231 and 232 may form parallel current paths between the conductive member 211 and the ground member 230.

In one embodiment, the ground point 211_2 may be connected to a first matching element 251 and/or a second matching element 252. The first matching element 251 and/or the second matching element 252 may control a frequency band. For example, when the first matching element 251 and/or the second matching element 252 includes a switching circuit, the first matching element 251 and/or the second matching element 252 may ground a signal having a frequency in a band of about 600 MHz to about 900 MHz or change the frequency band. When the first matching element 251 and/or the second matching element 252 are connected, the frequency band may be changed. In one embodiment, the first matching element 251 and/or the second matching element 252 may include a switch and/or a lumped element for impedance matching. As another example, the first matching element 251 and/or the second matching element 252 may include an element such as a varistor to prevent electric shock. The varistor may be a nonlinear semiconductor resistance element whose resistance value is changed by a voltage applied to both ends thereof. The first matching element 251 and/or the second matching element 252 are connected to the plurality of ground paths 231 and 232 by a shunt.

In one embodiment, the communication circuit 240 may feed power to the feeding point 211_1 through the feeding part 220. For example, the communication circuit 240 may be configured such that the conductive member 211 transmits and/or receives a signal in a first frequency band. In one embodiment, the first frequency band may be a low frequency band or a low band. For example, the first frequency band may be a band of about 600 MHz to about 900 MHz.

Figure 3A:
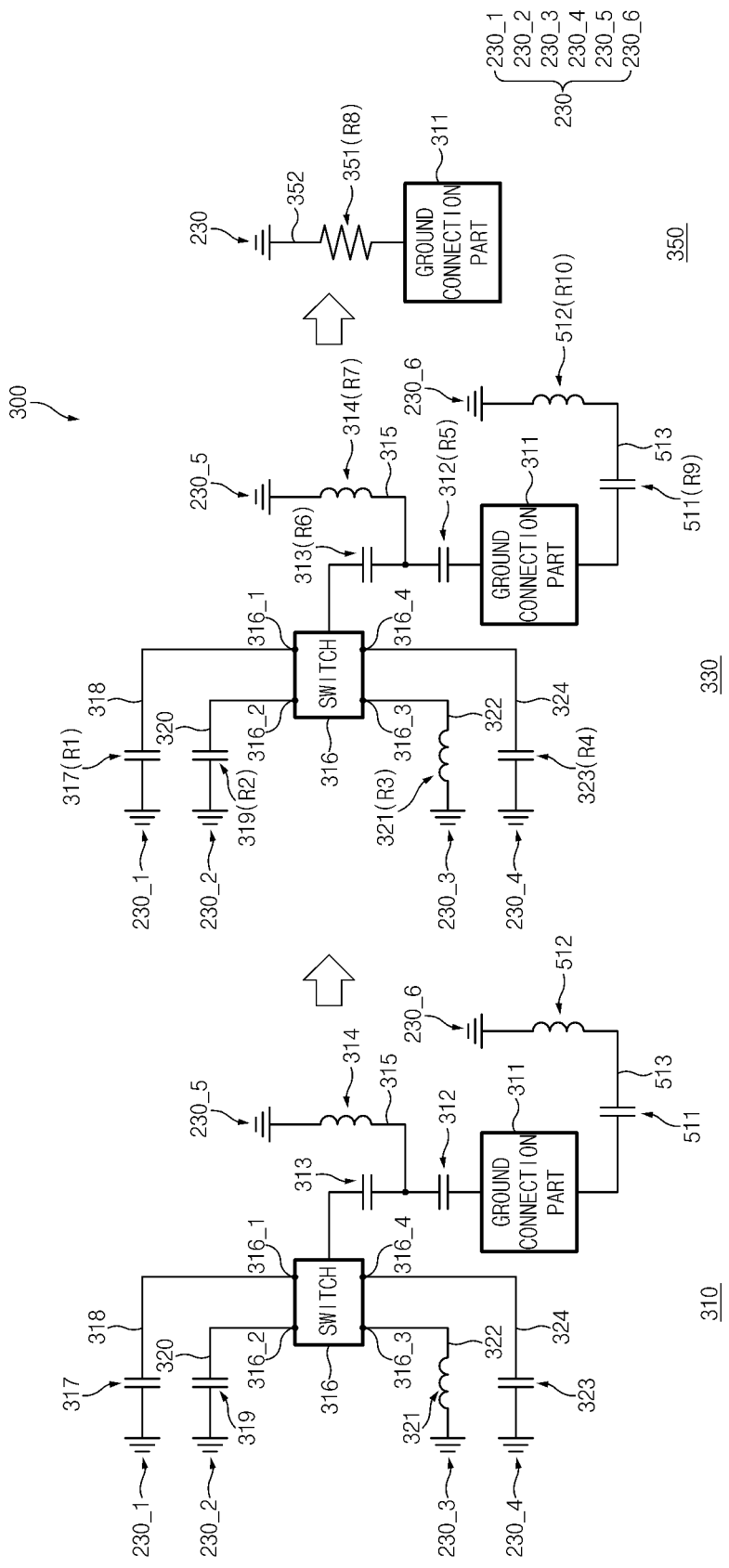
FIG. 3A is a circuit diagram of an electronic device according to an embodiment of the disclosure.

FIG. 3A is a circuit diagram 300 illustrating an electronic device (e.g., the electronic device 101 of FIG. 1) according to an embodiment of the disclosure.

Referring to a first circuit diagram 310 of FIG. 3A, a ground connection part 311 may be connected to a switch 316 through a first capacitor 312 and/or a second capacitor 313. The ground connection part 311 may connect a ground point (e.g., the ground point 211_2 of FIG. 2) to a plurality of ground paths (e.g., the plurality of ground paths 231 and 232 of FIG. 2). For example, the ground connection part 311 may be a conductive pad and/or a conductive pattern.

According to an embodiment, the switch 316 may selectively connect the ground connection part 311 and first to fourth ground members 230_1, 230_2, 230_3, and 230_4.

In one embodiment, a first ground path 315 including a third element 314 may be disposed between the first element 312 and/or the second element 313. Although it is illustrated as an example in FIGS. 3A and 3B that the first element 312 and the second element 313 are capacitors and the third element 314 is an inductor, the disclosure is not limited thereto and the first to third element 312, 313, and 314 may include a capacitor or an inductor. The first ground path 315 may be connected to a fifth ground member 230_5.

In one embodiment, the ground connection part 311 may be connected to a sixth ground member 230_6 through a second ground path 513. The second ground path 513 may include a fifth lumped element 511 and/or a sixth lumped element 512. Although it is illustrated as an example in FIGS. 3A and 3B that the fifth lumped element 511 is a capacitor and the sixth lumped element 512 is an inductor, the disclosure is not limited thereto and the fifth lumped element 511 and the sixth lumped element 512 may include a capacitor or an inductor.

According to an embodiment, the first to fourth ground members 230_1, 230_2, 230_3, and 230_4 selectively connected to the ground connection part 311 through the switch 316, the fifth ground member 230_5 connected to the ground connection part 311 through the first ground path 315, and the sixth ground member 230_6 connected to the ground connection part 311 through the second ground path 513 may be substantially the same as the ground member 230 of FIG. 2.

According to an embodiment, the first to sixth ground members 230_1 to 230_6 may be one ground member. For example, the ground member 230 may include first to sixth ground members 230_1 to 230_6. As another example, some of the first to sixth ground members 230_1 to 230_6 may be one ground member. For example, connection points of the first to sixth ground members 230_1 to 230_6 connected to the switch 316 may be different. According to an embodiment, the ground member 230 may include a ground layer included in a PCB, a ground included in a display, or a ground included in a support member.

Referring to the first circuit diagram 310 of FIG. 3A, the switch 316 may include a first terminal 316_1, a second terminal 316_2, a third terminal 316_3, or a fourth terminal 316_4. The first terminal 316_1 may be connected to the first ground member 230_1. The second terminal 316_2 may be connected to the second ground member 230_2. The third terminal 316_3 may be connected to the third ground member 230_3. The fourth terminal 316_4 may be connected to the fourth ground member 230_4.

In one embodiment, the first terminal 316_1 and the first ground member 230_1 may be connected through a first path 318 including a first lumped element 317. The second terminal 316_2 and the second ground member 230_2 may be connected through a second path 320 including a second lumped element 319. The third terminal 316_3 and the third ground member 230_3 may be connected through a third path 322 including a third lumped element 321. The fourth terminal 316_4 and the fourth ground member 230_4 may be connected through a fourth path 324 including a fourth lumped element 323. Although it is illustrated as an example in FIGS. 3A and 3B that the first lumped element 317, the second lumped element 319, and the fourth lumped element 323 are capacitors and the third lumped element 321 is an inductor, the disclosure is not limited thereto and the first to fourth lumped elements 317, 319, 321, and 323 may include a capacitor or an inductor.

In one embodiment, at least one of the first to fourth lumped elements 317, 319, 321, and 323 may be subjected to impedance matching for a specified frequency band between the ground connection part 311 and the first to fourth ground members 230_1, 230_2, 230_3, and 230_4. For example, at least one of the first to fourth lumped elements 317, 319, 321, and 323 may have a capacitance and/or an inductance which are specified for impedance matching. For example, the capacitance of the first lumped element 317 may be about 0.001 nF. The inductance of the second lumped element 319 may be about 4.7 nH. The capacitance of the third lumped element 321 may be about 0.001 nF. The capacitance of the fourth lumped element 323 may be about 100 pF.

According to an embodiment, referring to a second circuit diagram 330 of FIG. 3A, at least one of the first to fourth lumped elements 317, 319, 321, and 323 may have a resistance component. For example, the first lumped element 317 may have a first resistance value R1. The second lumped element 319 may have a second resistance value R2. The third lumped element 321 may have a third resistance value R3. The fourth lumped element 323 may have a fourth resistance value R4. For example, the first resistance value R1 to the fourth resistance value R4 may be greater than or equal to about 0.1Ω and less than or equal to about 1.0Ω.

In one embodiment, the first element 312, the second element 313, and/or the third element 314 may have a resistance component. For example, the first element 312 may have a fifth resistance value R5. The second element 313 may have a sixth resistance value R6. The third element 314 may have a seventh resistance value R7. For example, the fifth resistance value R5 to the seventh resistance value R7 may be greater than or equal to about 0.1Ω and less than or equal to about 1.0Ω.

Referring to the second circuit diagram 330 and a third circuit diagram 350 of FIG. 3A, a combined resistance between the ground connection part 311 and the ground member 230 may be calculated based on the resistance values. For example, based on the resistance values of the first to fourth lumped elements 317, 319, 321, and 323, the first element 312, the second element 313, and the third element 314, the second circuit diagram 330 may be converted into a third circuit diagram 350 that is a Thevenin equivalent circuit of the second circuit diagram 330. When considering the first to fourth lumped elements 317, 319, 321, and 323, the first capacitor 312, the second capacitor 313, and the first inductor 314 as resistors, and applying the Thevenin equivalent circuit, as shown in the third circuit diagram 350, it may be substantially the same as the ground connection part 311 and the ground member 230 being connected to a path 352 including a first resistor 351. The first resistor 351 may have an eighth resistance value R8. For example, the resistance values of the first to fourth lumped elements 317, 319, 321, and 323, the first element 312, the second element 313, and the third element 314 may be substantially the same as the first resistor 351.

Referring to the first circuit diagram 310, the second circuit diagram 330, and the third circuit diagram 350 of FIG. 3A, at least two paths through which a current may flow may be formed in the ground connection part 311 which connects a conductive member that is an antenna radiator for a low frequency band (e.g., the conductive member 211 in FIG. 2) and the ground member 230. For example, a path through which a current flows may include the first ground path 315 in which the third element 314 is disposed and the second ground path 513 in which the sixth lumped element 512 is disposed.

Figure 3B:
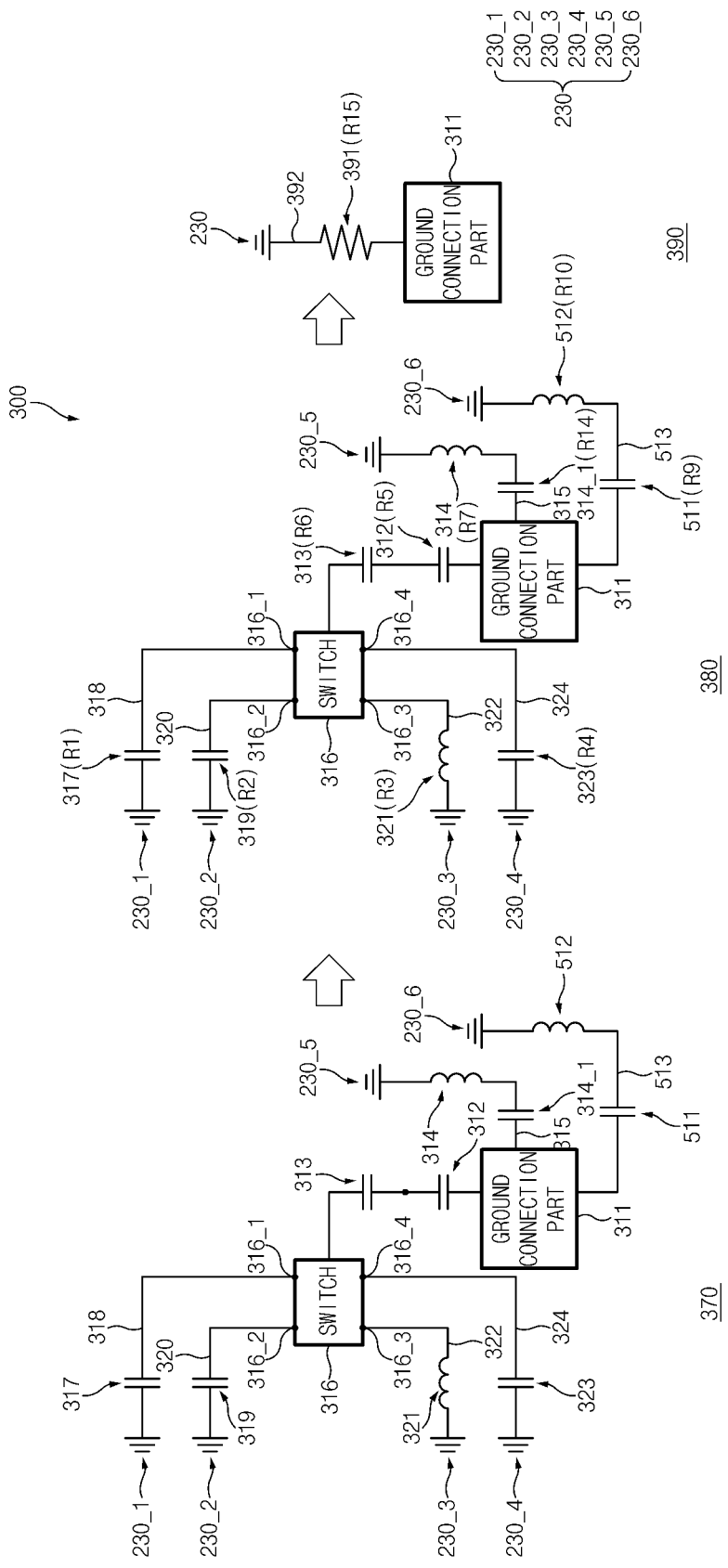
FIG. 3B is a circuit diagram of an electronic device according to an embodiment of the disclosure.

FIG. 3B is a circuit diagram 360 illustrating an electronic device (e.g., the electronic device 101 of FIG. 1) according to an embodiment of the disclosure.

Referring to FIG. 3B, the circuit diagram 360 may have a structure in which the first ground path 315 is connected to the ground connection part 311 in the circuit diagram 300 of FIG. 3A. The circuit diagram 360 of FIG. 3B may operate substantially equally to the circuit diagram 300 of FIG. 3A.

In one embodiment, the first ground path 315 may be connected to the ground connection part 311. Referring to a 1-1-th circuit diagram 370 of FIG. 3B, the first ground path 315 may connect the ground connection part 311 and the fifth ground member 230_5. The first ground path 315 may include the third element 314 and/or a 3-1-th element 314_1. For example, the third element 314 and/or the 3-1-th element 314_1 may be an inductor or a capacitor.

In one embodiment, the first ground path 315 may have a specified resistance value. Referring to a 2-1-th circuit diagram 380 of FIG. 3B, the third element 314 may have a seventh resistance value R7, and a 3-1-th element 314_1 may have a fourteenth resistance value R14.

In one embodiment, referring to the 2-1-th circuit diagram 380 and a third circuit diagram 390 of FIG. 3B, a combined resistance between the ground connection part 311 and the ground member 230 may be calculated based on the resistance values. For example, based on the resistance values of the first to fourth lumped elements 317, 319, 321, and 323, the first element 312, the second element 313, the third element 314, or the 3-1-th element 314_1 may be converted into the 3-1-th circuit diagram 390 that is a Thevenin equivalent circuit of the 2-1-th circuit diagram 380. When considering the first to fourth lumped elements 317, 319, 321, and 323, the first capacitor 312, the second capacitor 313, the inductor 314, or the 3-1-th element 314_1, as resistors, and applying the Thevenin equivalent circuit, as shown in the third circuit diagram 390, it may be substantially the same as the ground connection part 311 and the ground member 230 being connected to a path 392 including one resistor 391. When the first ground path 315 and the second ground path 513 are modeled as one path 392, the resistance value of one resistor 391 included in one path 392 is calculated as a combined resistance value. The combined resistance may be defined as a resistance value between the ground connection part 311 and the ground member 230. Referring to the 3-1-th circuit diagram 390 of FIG. 3B, a resistance value between the ground connection part 311 and the ground member 230 may be a fifteenth resistance value R15. The fifteenth resistance value R15 may be smaller than a resistance value between the ground connection part 311 and the ground member 230 when the ground connection part 311 and the ground member 230 are connected using only the first ground path 315 or the second ground path 513.

FIG. 4 is a diagram 400 illustrating a ground point 411, a ground member 412, ground paths 430 and 460, and a first switching circuit 440 of an electronic device (e.g., the electronic device 101 of FIG. 1) according to an embodiment of the disclosure.

In one embodiment, the PCB of the electronic device 101 may include a first layer 410 and a second layer 450. For example, the first layer 410 may include the first ground path 430. As another example, the second layer 450 may include the second ground path 460.

In one embodiment, a ground connection part 401 and a feeding connection part 402 may be disposed on the first layer 410. For example, the ground connection part 401 may be a conductive pad and/or a conductive pattern for connecting a conductive member (e.g., the conductive member 211 of FIG. 2) to the ground member 412. The feeding connection part 402 may be a conductive pad and/or a conductive pattern for connecting a conductive member (e.g., the conductive member 211 of FIG. 2) to a feeding part (e.g., the feeding part 220 of FIG. 2).

In one embodiment, the ground point 411 may be located on the ground part 401. As a current flows from the ground point 411 to the ground member 412 (e.g., the ground member 230 of FIG. 2), the conductive member 211 may be grounded.

In one embodiment, the ground point 411 (e.g., the ground point 211_2 of FIG. 2) and the ground member 412 may be connected through the first ground path 430 (e.g., the first ground path 231 and the second ground path 232 of FIG. 2). The first ground path 430 may ground a signal in a specified frequency band.

According to an embodiment, the specified frequency band may be adjusted through the first switching circuit 440 (e.g., the switch 316 of FIGS. 3A and 3B). The first switching circuit 440 may be connected to the ground connection part 401 (e.g., the ground connection part 311 of FIGS. 3A and 3B). The first switching circuit 440 may change a frequency band grounded by the first ground path 430. For example, the first switching circuit 440 may change the impedance of a first matching circuit 431 and/or a second matching circuit 435 when the first switching circuit 440 is connected to the ground connection part 401 to change a frequency band which is grounded by a first ground line 433.

In one embodiment, the first ground path 430 may be disposed in the first layer 410 that is a top layer of the PCB. The first ground path 430 may include the first ground line 433 disposed in the first layer 410 of the PCB and a first matching circuit 431 and/or a second matching circuit 435 which the first ground line 433 passes through.

In one embodiment, the first ground line 433 may extend to the ground member 412.

In one embodiment, the first matching circuit 431 and the second matching circuit 435 may include at least one switching element. In one embodiment, the first matching circuit 431 and the second matching circuit 435 may include at least one lumped element. For example, the first matching circuit 431 may include a lumped element disposed on the first ground line 433 or disposed as a shunt with the first ground line 433. For example, the at least one lumped element may be an inductor and/or a capacitor.

In one embodiment, the second ground path 460 connected to a ground point 451 may be disposed in the second layer 450 of the PCB. The second ground path 460 may include a second ground line 461, a third matching circuit 463, and/or a fourth matching circuit 465. The second ground line 461, the third matching circuit 463, and/or the fourth matching circuit 465 may form the second ground path 460 disposed separately from the first ground path 430 in the PCB.

In one embodiment, the plurality of ground paths (e.g., the plurality of ground paths 231 and 232 of FIG. 2) may include the first ground path 430 and the second ground path 460.

In one embodiment, when the plurality of ground paths (e.g., the first ground path 430 and the second ground path 460) are formed, the bottleneck of currents in the ground connection part 401 of the conductive member 211 may be reduced. For example, when a plurality of ground paths 430 and 460 are formed, a bottleneck caused when currents induced in the conductive member 211 share one path may be reduced. When the plurality of ground paths 430 and 460 are formed, the amount of current flowing from the ground connection part 401 to the ground member 412 may be increased.

Figure 5:
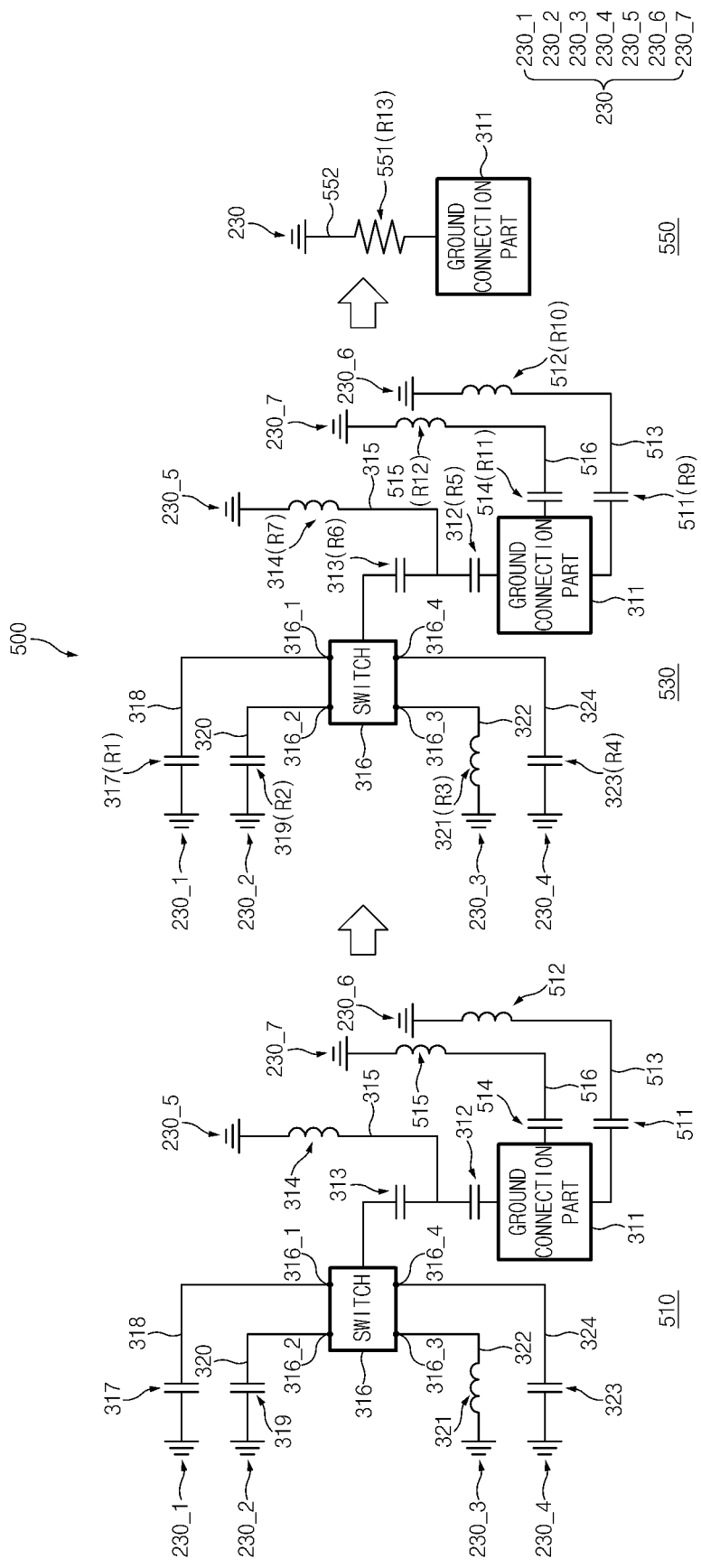
FIG. 5 is a circuit diagram of an electronic device according to an embodiment of the disclosure.

FIG. 5 is a circuit diagram 500 illustrating an electronic device (e.g., the electronic device 101 of FIG. 1) according to an embodiment of the disclosure.

FIG. 5 illustrates a structure in which a third ground path 516 is additionally disposed in the circuit diagram 300 of FIG. 3A.

Referring to a fourth circuit diagram 510 of FIG. 5, the ground connection part 311 may be connected to the ground members 230_5, 230_6, and 230_7 through the first ground path 315, the second ground path 513, and/or the third ground path 516. In one embodiment, the second ground path 513 may include the fifth lumped element 511 and/or the sixth lumped element 512. In one embodiment, the third ground path 516 may include a seventh lumped element 514 and/or an eighth lumped element 515.

According to an embodiment, the ground connection part 311 may be connected to the switch 316 through the first capacitor 312 and/or the second capacitor 313. For example, the switch 316 may be an RF switch selectively connected to the first to fourth paths 318, 320, 322, and 324 to change a frequency.

Referring to the fourth circuit diagram 510 of FIG. 5, the switch 316 may include first to fourth terminals 316_1, 316_2, 316_3, and 316_4. The first terminal 316_1 may be connected to the first ground member 230_1. The second terminal 316_2 may be connected to the second ground member 230_2. The third terminal 316_3 may be connected to the third ground member 230_3. The fourth terminal 316_4 may be connected to the fourth ground member 230_4.

Referring to a fifth circuit diagram 530 of FIG. 5, the fifth lumped element 511, the sixth lumped element 512, a seventh lumped element 514, and the eighth lumped element 515 according to an embodiment may have resistance components. The fifth lumped element 511 may have a ninth resistance value R9. For example, the ninth resistance value R9 may be greater than or equal to about $0.1\Omega$ and less than or equal to about $1.0\Omega$. The sixth lumped element 512 may have a tenth resistance value R10. For example, the tenth resistance value R10 may be greater than or equal to about $0.1\Omega$ and less than or equal to about $1.0\Omega$. The seventh lumped element 514 may have an eleventh resistance value R11. For example, the eleventh resistance value R11 may be greater than or equal to about $0.1\Omega$ and less than or equal to about $1.0\Omega$. The eighth lumped element 515 may have a twelfth resistance value R12. For example, the twelfth resistance value R12 may be greater than or equal to about $0.1\Omega$ and less than or equal to about $1.0\Omega$.

In one embodiment, the fourth circuit diagram 510 of FIG. 5 may have a switching width of a frequency band substantially the same as that of the first circuit diagram 310 of FIGS. 3A and 3B. For example, the first ground path 315, the second ground path 513, and the third ground path 516 of the fourth circuit diagram 510 may have substantially the same electrical length as the first ground path 315 including the first inductor 314 of FIGS. 3A and 3B. For example, the combined inductance components of the first ground path 315, the second ground path 513, and the third ground path 516 of the fourth circuit diagram 510 may be substantially equal to the inductance of the first ground path 315.

In one embodiment, referring to the fourth circuit diagram 510 of FIG. 5, the fifth circuit diagram 530, and a sixth circuit diagram 550, a thirteenth resistor 551 having a resistance R13 that is a combined resistance value of a path 552 between the ground connection part 311 and the ground member 230 may be smaller than the eighth resistor R8 that is a combined resistance between the ground connection part 311 and the ground member 230 of the third circuit diagram 350. When a plurality of ground paths (e.g., the first ground path 315, the second ground path 513, and the third ground path 516) are formed to reduce the combined resistance value between the ground connection part 311 and the ground member 230, the radiation performance of the conductive member (e.g., the conductive member 211 of FIG. 2) in a low frequency band may be improved.

Figure 6:
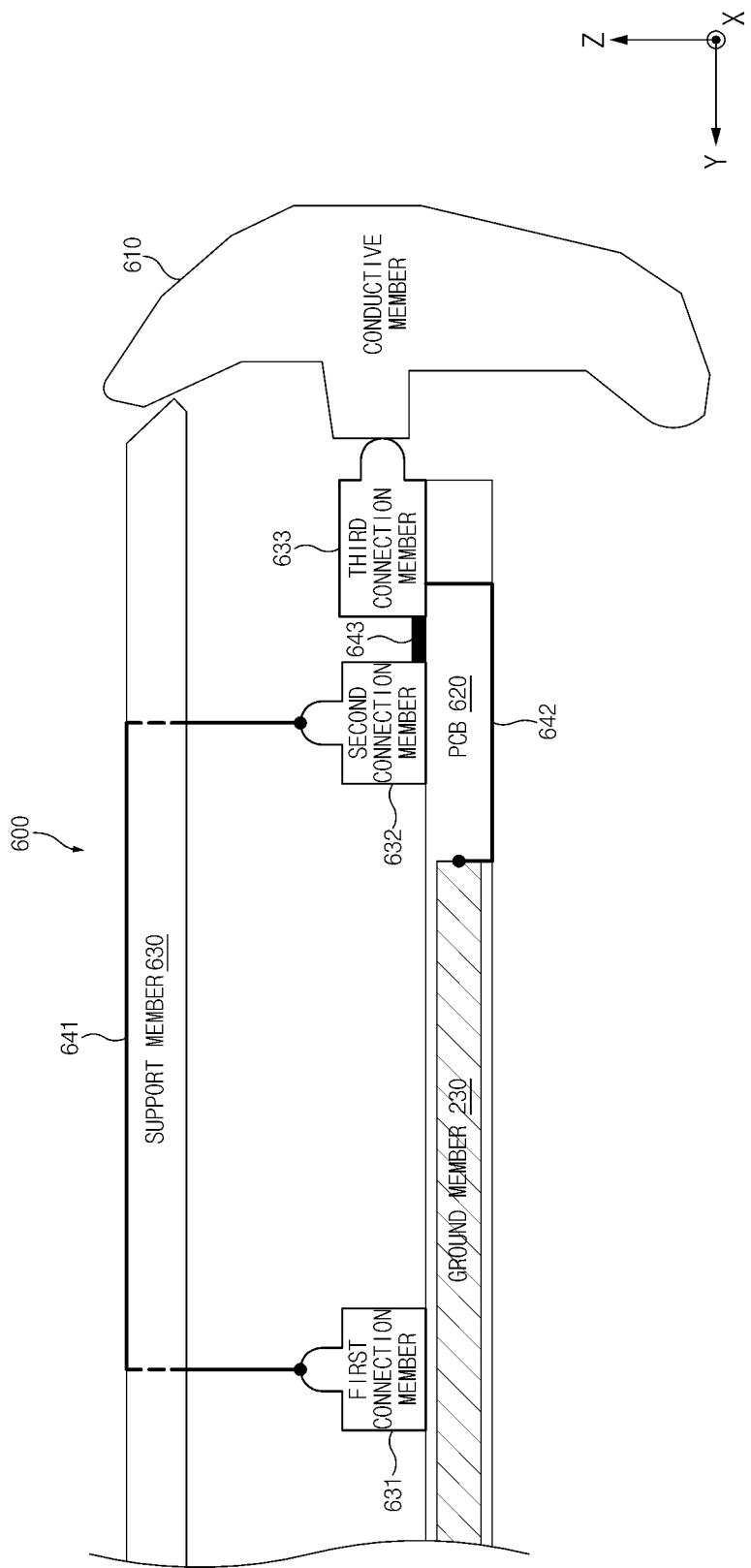
FIG. 6 is a diagram illustrating ground paths of an electronic device according to an embodiment of the disclosure.

FIG. 6 is a diagram 600 illustrating ground paths 641 and 642 of an electronic device (e.g., the electronic device 101 of FIG. 1) according to an embodiment of the disclosure. The electronic device 101 according to an embodiment may include a conductive member 610 (e.g., the conductive member 211 of FIG. 2), a PCB 620, and/or a support member 630.

In one embodiment, the conductive member 610 may be at least a portion of a housing (e.g., the housing 210 of FIG. 2) of the electronic device 101. For example, the conductive member 610 may form at least a portion of a side member of the electronic device 101.

In one embodiment, the PCB 620 may include the ground member 230. For example, the ground member 230 may be a ground layer included in the PCB 620.

In one embodiment, the support member 630 may be disposed substantially parallel to the PCB 620 in the +Z-axis direction from the PCB 620. In one embodiment, the support member 630 may be formed of a conductive material. As another example, the support member 630 may be formed of a non-conductive injection molding material. The support member 630 may support the PCB 620 inside the electronic device 101.

In one embodiment, the conductive member 610 may be connected to the ground member 230 through a plurality of connection members 631, 632, and 633 and a plurality of ground paths 641 and 642 (e.g., the second ground path 513 and the third ground path 513 of FIG. 5). The plurality of connection members 631, 632, and 633 may include the first connection member 631, the second connection member 632, and the third connection member 633. For example, the first connection member 631, the second connection member 632, and/or the third connection member 633 may be a C-clip. As another example, the first connection member 631, the second connection member 632, and/or the third connection member 633 may be a metal pad. The plurality of ground paths 641 and 642 may include the first ground path 641 (e.g., the second ground path 513 in FIG. 5) and the second ground path 642 (e.g., the third ground path 516 in FIG. 5).

In one embodiment, the first ground path 641 may be a conductive pattern. For example, the first ground path 641 may be a laser direct structuring (LDS) pattern. For example, the first ground path 641 may be formed in an LDS pattern to have the effect of disposing a first inductor (e.g., the first inductor 314 in FIGS. 3A and 3B) without disposing a separate lumped element.

In one embodiment, the ground member 230 may be connected to the first ground path 641 through the first connection member 631. For example, the first connection member 631 may be disposed on the ground member 230.

In one embodiment, the second connection member 632 and the third connection member 633 may be electrically connected through a connection path 643. The third connection member 633 may be connected to the conductive member 610.

In one embodiment, the second ground path 642 may be connected to the ground member 230. For example, the second ground path 642 may be connected to the third connection member 633 to be connected to the conductive member 610.

In one embodiment, the first and second ground paths 641 and 642 may connect the conductive member 610 and the ground member 230 in parallel. The first ground path 641 may be formed in an LDS pattern to be connected to the ground member 230. The second ground path 642 may be connected to the ground member 230 via at least a portion of the PCB 620.

Figure 7:
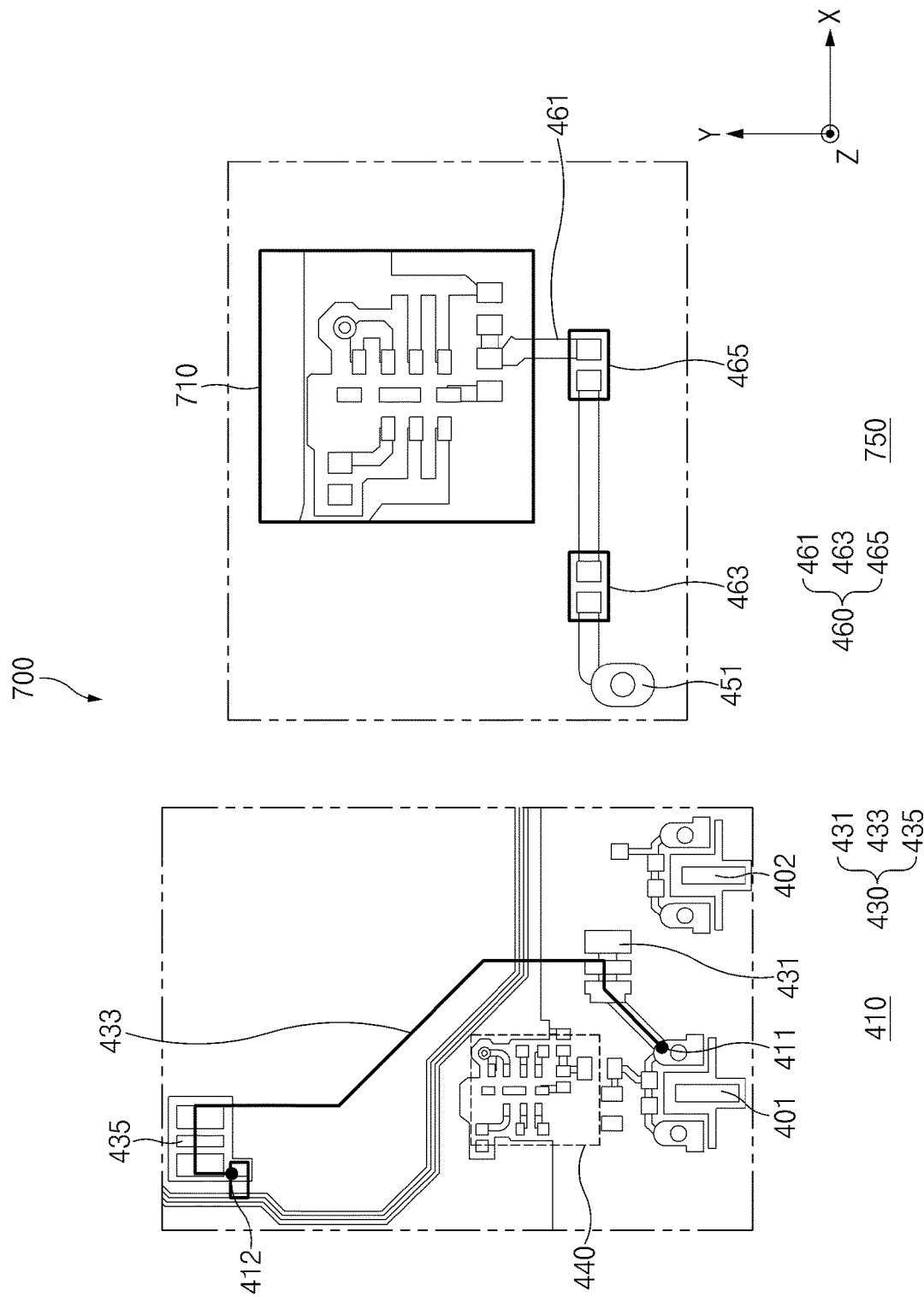
FIG. 7 is a diagram illustrating a ground point, a ground member, ground paths, and switching circuits of an electronic device according to an embodiment of the disclosure.

FIG. 7 is a diagram 700 illustrating the ground point 411, the ground member 412, the ground paths 430 and 460, and switching circuits 440 and 710 of an electronic device (e.g., the electronic device 101 of FIG. 1) according to an embodiment of the disclosure.

The electronic device 101 of FIG. 7 is substantially identical to the electronic device of FIG. 4, except that the second switching circuit 710 is additionally disposed on a second layer 750 of the electronic device 101 of FIG. 4, so that a description overlapping with FIG. 4 will be omitted.

In one embodiment, the second switching circuit 710 may be disposed on the second ground path 460. The second ground path 460 may include the second ground line 461 disposed along the second layer 750 of a PCB (e.g., the PCB 620 of FIG. 6) and the second switching circuit 710 which the second ground line 461 pass through.

In one embodiment, the second switching circuit 710 may be disposed on the PCB 620. The second switching circuit 710 may control a frequency band grounded by the second ground path 460.

In one embodiment, by connecting the first ground path 430 (e.g., first ground path 231 of FIG. 2 and/or the first ground path 315 of FIGS. 3A and 3B) and the second ground path 460 (e.g., the second ground path 232 of FIG. 2 and/or the second ground path 513 of FIGS. 3A and 3B) in parallel between a conductive member (e.g., the conductive member 610 in FIG. 6) and a ground member (e.g., a ground member 621 in FIG. 6), the combined inductance between the conductive member 610 and the ground member 621 may be reduced. When the combined inductance between the conductive member 610 and the ground member 621 is reduced, the performance of the antenna may be reduced during an in-band process. When the second switching circuit 710 is added to the second ground path 460 and the switch of the second switching circuit 710 is opened (turned off), the resonance length of the antenna may be maintained. When the switch of the second switching circuit 710 is selectively short-circuited (turned-on), the first ground path 430 and/or the second ground path 460 may be used selectively in a frequency band, such as a low frequency band in which the radiation performance of the antenna is to be improved. For example, the second switching circuit 710 may be applied to an antenna structure in which performance degradation of the antenna occurs when the resonance length is decreased. For example, when the electronic device 101 supports a first frequency band of about 600 MHz or more and about 700 MHz or less and a second frequency band of about 800 MHz or more and about 900 MHz or less, transmission/reception performance in the first frequency band and transmission/reception performance in the second frequency band may have a trade-off relationship with each other. When the first ground path 430 and/or the second ground path 460 is selectively used using the second switching circuit 710, both the transmission/reception performance in the first frequency band and the transmission/reception performance in the second frequency band are improved.

Figure 8:
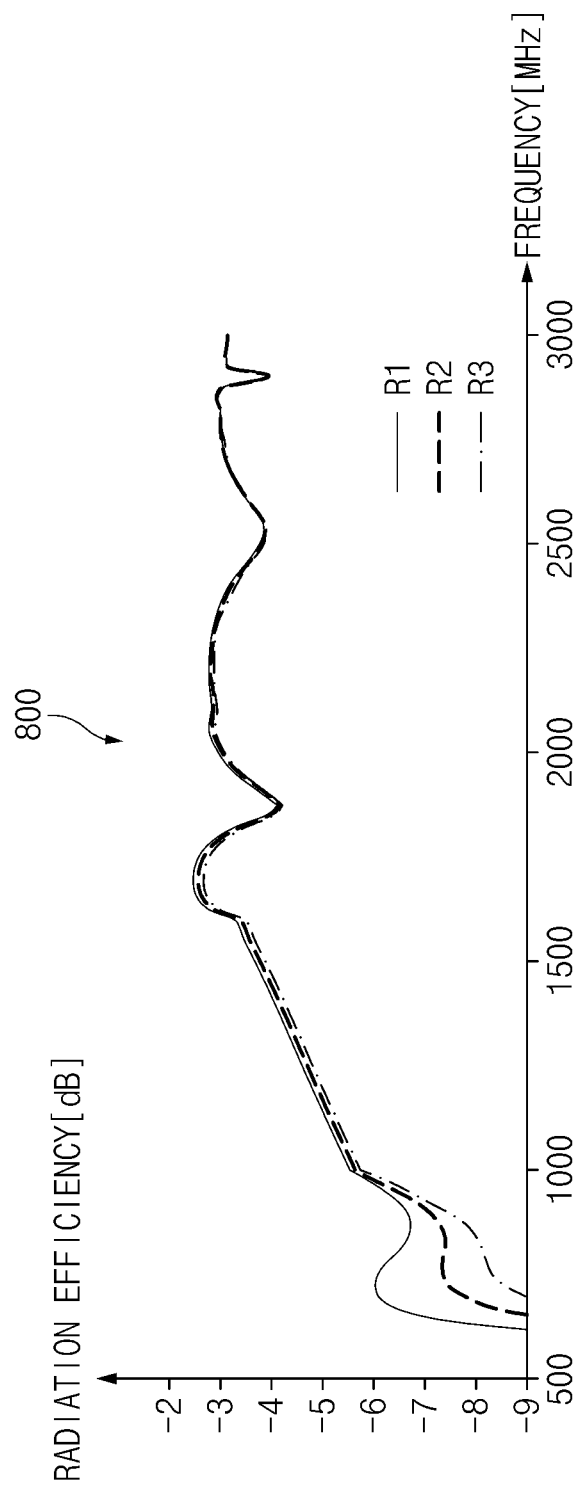
FIG. 8 is a graph showing radiation efficiency according to a combined resistor of ground paths of an electronic device according to an embodiment of the disclosure.

FIG. 8 is a graph 800 showing radiation efficiency according to a combined resistor of ground paths (e.g., the plurality of ground paths 231 and 232 of FIG. 2) of an electronic device (e.g., the electronic device 101 of FIG. 1) according to an embodiment of the disclosure.

In one embodiment, the combined resistor of the ground paths 231 and 232 may be a first resistor R1, a second resistor R2, and/or a third resistor R3. For example, the second resistor R2 may be greater than the first resistor R1. The third resistor R3 may be greater than the second resistor R2.

In one embodiment, when the combined resistor of the ground paths 231 and 232 is the first resistor R1, the radiation efficiency of the conductive member (e.g., the conductive member 211 of FIG. 2) of the electronic device 101 may be higher than the radiation efficiency in a case where the combined resistor of the ground paths 231 and 232 is the second resistor R2. When the combined resistor of the ground paths 231 and 232 is the second resistor R2, the radiation efficiency of the conductive member 211 may be higher than the radiation efficiency in a case where the combined resistor of the ground paths 231 and 232 is the third resistor R3.

In one embodiment, the radiation efficiency of the conductive member 211 may increase as the combined resistance value of the ground paths 231 and 232 decreases. For example, it can be seen that the radiation efficiency of the conductive member 211 increases as the combined resistance value of the ground paths 231 and 232 decreases in a low frequency band of about 600 MHz or more to about 900 MHz or less.

Figure 9:
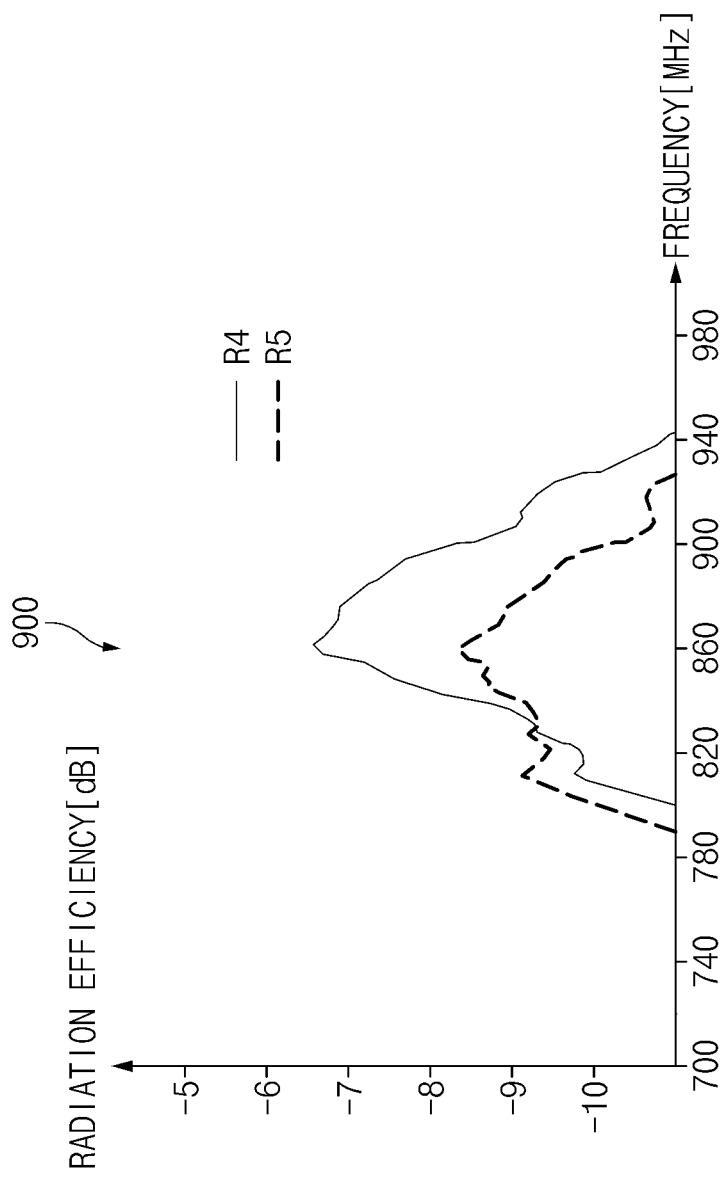
FIG. 9 is a graph showing radiation efficiency in a low frequency band according to a combined resistor of ground paths of an electronic device according to an embodiment of the disclosure.

FIG. 9 is a graph 800 showing radiation efficiency in a low frequency band according to a combined resistor of ground paths (e.g., the plurality of ground paths 231 and 232 of FIG. 2) of an electronic device (e.g., the electronic device 101 of FIG. 1) according to an embodiment of the disclosure.

In one embodiment, the combined resistor of the ground paths 231 and 232 may be a fourth resistor R4 and/or a fifth resistor R5. The fifth resistor R5 may be greater than the fourth resistor R4.

In one embodiment, when the combined resistor of the ground paths 231 and 232 is the second resistor R4, the radiation efficiency of the conductive member (e.g., the conductive member 211 of FIG. 5) of the electronic device 101 may be higher than the radiation efficiency in a case where the combined resistor of the ground paths 231 and 232 is the fifth resistor R5. For example, when the combined resistor of the ground paths 231 and 232 is the fourth resistor R4 at a frequency of about 860 MHz, the radiation efficiency may be about −7 dB. As another example, when the combined resistor of the ground paths 231 and 232 is the fifth resistor R5 at a frequency of about 860 MHz, the radiation efficiency may be about −8.5 dB.

Figure 10:
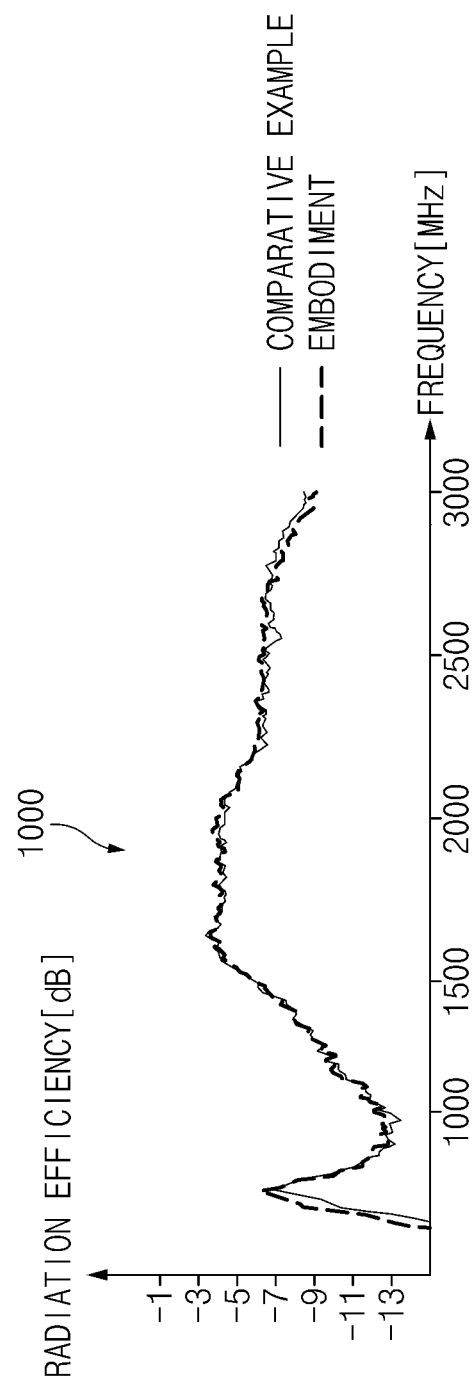
FIG. 10 is a graph showing radiation efficiencies of an electronic device according to an embodiment of the disclosure.

FIG. 10 is a graph 1000 showing radiation efficiency of an electronic device (e.g., the electronic device 101 of FIG. 1) according to a comparative example and an embodiment of the disclosure.

At a frequency of about 700 MHz, the radiation efficiency of the comparative example may be about −7.5 dB. In comparison, the radiation efficiency of the embodiment of the disclosure at a frequency of about 700 MHz may be about −6.5 dB.

In one embodiment, in an electronic device including an exterior metal frame in which at least a portion of a housing (e.g., the housing 210 of FIG. 2) is a conductive member (e.g., the conductive member 211 of FIG. 2), it can be seen that the radiation performance has been improved about 1 dB level in a Lowband which is a low-frequency band.

Figure 11:
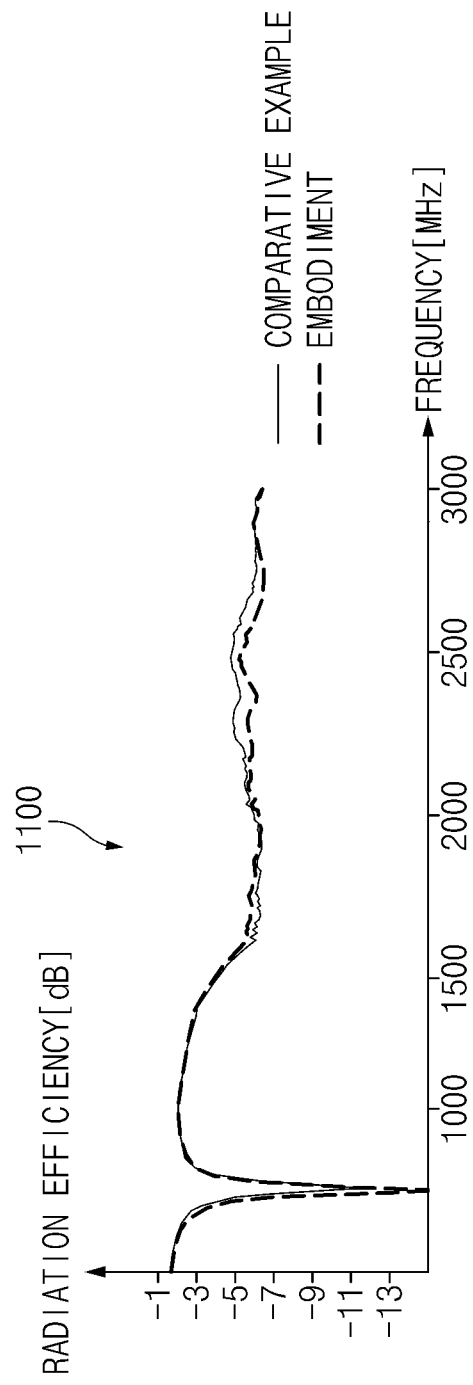
FIG. 11 is a graph showing radiation coefficients of an electronic device according to an embodiment of the disclosure.

FIG. 11 is a graph 1100 showing radiation coefficient of an electronic device (e.g., the electronic device 101 of FIG. 1) according to an embodiment of the disclosure.

At a frequency of about 700 MHz, the radiation coefficient of the comparative example may be about −13 dB. In comparison, the radiation coefficient of an embodiment of the disclosure at a frequency of about 700 MHz may be about −14 dB.

In one embodiment, in an electronic device including an exterior metal frame in which at least a portion of a housing (e.g., the housing 210 of FIG. 2) is a conductive member (e.g., the conductive member 211 of FIG. 2), it can be seen that the radiation performance has been improved about 1 dB level due to a decrease of about 1 dB in the radiation coefficient in a Lowband which is a low-frequency band.

According to various embodiments, an electronic device (e.g., the electronic device 101 of FIG. 1) may include a housing including a conductive member (e.g., the conductive member 211 of FIG. 2) in which at least one feeding point (e.g., the feeding point 211_1 of FIG. 2) and a ground point (e.g., the ground point 211_2 of FIG. 2) are located, at least one ground member (e.g., the ground member 230 of FIG. 2) disposed inside the housing, a first ground path (e.g., the first ground path 231 of FIG. 2) connecting the ground point 211_2 and the ground member 230; a second ground path (e.g., the second ground path 232 of FIG. 2) connecting the ground point 211_2 and the ground member 230; a PCB (e.g., the PCB 620 of FIG. 6) disposed inside the housing 210; and a processor (e.g., the processor 120 of FIG. 2) disposed on the PCB, and the processor 120 may feed the at least one feeding point 211_1 such that the conductive member 211 transmits and/or receives a signal of a first frequency band.

In one embodiment, the first ground path 231 may include at least one first matching element (e.g., the first matching element 251 of FIG. 2).

In one embodiment, the second ground path 232 may include at least one second matching element (e.g., the second matching element 252 of FIG. 2).

In one embodiment, the first ground path 231 and the second ground path 232 may connect a ground connection part (e.g., the ground connection part 311 of FIG. 3A) connecting the ground point 211_2 and the conductive member 211 and the ground member 230 in parallel, and the first ground path 231 or the second ground path 232 may include at least one element (e.g., the first element 312, the second element 313, and/or the third element 314 of FIG. 3A).

In one embodiment, the ground member 230 may be a ground included in the PCB 620, a ground included in a support member (e.g., the support member 630 of FIG. 6) disposed inside the housing 210, and/or a ground included in a display (e.g., the display device 160 of FIG. 1) viewed through at least a portion of the housing 210.

In one embodiment, the first ground path 231 and the second ground path 232 may be connected to each other.

In one embodiment, the first frequency band may be 600 MHz or more and 900 MHz or less.

In one embodiment, the at least one ground member 230 may have a ground voltage of substantially an identical level.

According to various embodiments, the electronic device 101 may include the housing 210 formed of the conductive member 211, at least a portion of the conductive member 211 being a radiator of a low frequency band, the support member 630 disposed inside the housing 210, and the PCB 620 disposed inside the housing 210 and including the ground member 230, wherein the ground point 211_2 may be located on the conductive member 211, the ground point 211_2 and the ground member 230 may be connected through a plurality of ground paths (e.g., the plurality of ground paths 641 and 642 of FIG. 6), and the plurality of ground paths may include a first ground path (e.g., the first ground path 641 of FIG. 6), including an LDS pattern extending along the support member 630 and a second ground path (e.g., the second ground path 642 of FIG. 6) formed along the PCB 620.

In one embodiment, the second ground path 642 may include a first ground line (e.g., the first ground line 433 of FIG. 4) disposed along the PCB 620 and a first matching circuit (e.g., the first matching circuit 431 of FIG. 4) which the first ground line 433 passes through.

In one embodiment, the ground connection part (e.g., the ground connection part 311 of FIGS. 3A and 3B) connected to the ground point 211_2 may be connected to a switching circuit (e.g., the first switching circuit 440 of FIG. 4) which controls a frequency band, the switching circuit being grounded by the plurality of ground paths 641 and 642.

In one embodiment, the PCB 620 may further include at least one feeding part (e.g., the feeding part 220 of FIG. 2) and the processor 120, at least one feeding point 211_1 may be further located on the conductive member 211, and the processor 120 may feed the at least one feeding point 211_1 through the at least one feeding part 220 such that the conductive member 211 transmits and/or receives a signal in the low frequency band.

In one embodiment, the low frequency band may be 600 MHz or more and 900 MHz or less.

In one embodiment, the first matching circuit 431 may include at least one lumped element (e.g., the first lumped element 317, the second lumped element 319, the third lumped element 321, and/or the fourth lumped element 323 of FIG. 3A) and the at least one lumped element 317, 319, 321 and/or 323 may be an inductor and/or capacitor.

In one embodiment, the LDS pattern may extend toward the conductive member (e.g., the conductive member 610 of FIG. 6) along the support member 630 to be connected to a second connection member (e.g., the second connection member 632 of FIG. 6) disposed on the PCB 620, and the second connection member 632 may be connected to a third connection member (e.g., the third connection member 633 of FIG. 6) connected to the conductive member 610.

According to various embodiments, the electronic device 101 may include the housing 210 including the conductive member 211 in which at least one feeding point 211_1 and the ground point 211_2 are located, the PCB 620 disposed inside the housing 210 and including at least one feeding part 220 and the ground member 230, and the processor 120 disposed on the PCB 620, wherein the plurality of ground paths 641 and 642 connect the ground member 230 and the ground point 211_2, the processor 120 may feed the at least one feeding point 211_1 such that the conductive member 211 transmits and/or receives a signal of 600 MHz or more and 900 MHz, a combined resistance of the plurality of ground paths 641 and 642 may be a first resistance value, and the first resistance value may be less than or equal to a second resistance value that is a resistance value of a resistor connecting between the ground member 230 and the ground point 211_2 through a single ground path.

In one embodiment, the combined inductance of the plurality of ground paths 641 and 642 may be identical to an inductance connecting the ground member 230 and the ground point 211_2 through a single ground path.

In one embodiment, each of the plurality of ground paths 231 and 232 may include at least one lumped element 317, 319, 321, and/or 323, and the at least one lumped element 317, 319, 321 and/or 323 may be an inductor and/or a capacitor.

In one embodiment, the ground point 211_2 may be connected to at least one switching circuit 440.

In one embodiment, the plurality of ground paths 641 and 642 may include the first ground path 641, and the first ground path 641 may include the first ground line 433 disposed along the PCB 620 and the first matching circuit 431 through which the first ground line 433 passes.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a conductive member in which at least one feeding point and a ground point are located;
   at least one ground member disposed inside the housing;
   a first ground path connecting the ground point and the at least one ground member;
   a second ground path connecting the ground point and the at least one ground member;
   a printed circuit board (PCB) disposed inside the housing and comprising a first layer and a second layer different from the first layer; and
   a processor disposed on the PCB,
   wherein the processor is configured to feed the at least one feeding point such that the conductive member transmits and/or receives a signal of a first frequency band,
   wherein the first ground path is formed at the first layer, and
   wherein the second ground path is formed at the second layer.

2. The electronic device of claim 1, wherein the first ground path includes at least one first matching element.

3. The electronic device of claim 1, wherein the second ground path includes at least one second matching element.

4. The electronic device of claim 1,
   wherein the first ground path and the second ground path connect a ground connection part connecting the ground point and the at least one ground member in parallel, and
   wherein the first ground path or the second ground path includes at least one element.

5. The electronic device of claim 1, wherein the at least one ground member is a ground included in the PCB, a ground included in a support member disposed inside the housing, and/or a ground included in a display viewed through at least a portion of the housing.

6. The electronic device of claim 1, wherein the first ground path and the second ground path are connected to each other.

7. The electronic device of claim 1, wherein the first frequency band is 600 MHz or more and 900 MHz or less.

8. The electronic device of claim 1, wherein the at least one ground member has a ground voltage of substantially an identical level.

9. An electronic device comprising:
   a housing formed of a conductive member, at least a portion of the conductive member being a radiator of a low frequency band;
   a support member disposed inside the housing; and
   a printed circuit board (PCB) disposed inside the housing and including a ground member,
   wherein a ground point is located on the conductive member,
   wherein the ground point and the ground member are connected through a plurality of ground paths, and
   wherein the plurality of ground paths include:
      a first ground path including a laser direct structuring (LDS) pattern extending along the support member, and
      a second ground path formed along the PCB, and
   wherein the first ground path is physically separate from the second ground path.

10. The electronic device of claim 9, wherein the second ground path includes a first ground line disposed along the PCB and a first matching circuit which the first ground line passes through.

11. The electronic device of claim 10,
    wherein the first matching circuit includes at least one lumped element, and
    wherein the at least one lumped element is an inductor and/or capacitor.

12. The electronic device of claim 9, wherein a ground connection part connected to the ground point is connected to a switching circuit configured to control a frequency band, the switching circuit being grounded by the plurality of ground paths.

13. The electronic device of claim 9,
    wherein the PCB further includes:
       at least one feeding part, and
       a processor,
    wherein at least one feeding point is further located on the conductive member, and
    wherein the processor is configured to feed the at least one feeding point through the at least one feeding part such that the conductive member transmits and/or receives a signal in the low frequency band.

14. The electronic device of claim 13, wherein the low frequency band is 600 MHz or more and 900 MHz or less.

15. The electronic device of claim 9,
    wherein the LDS pattern extends toward the conductive member along the support member to be connected to a second connection member disposed on the PCB, and
    wherein the second connection member is connected to a third connection member connected to the conductive member.

* * * * *